United States Patent Office 3,579,459
Patented May 18, 1971

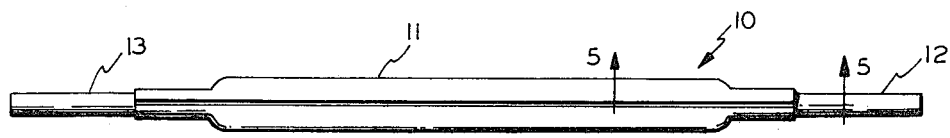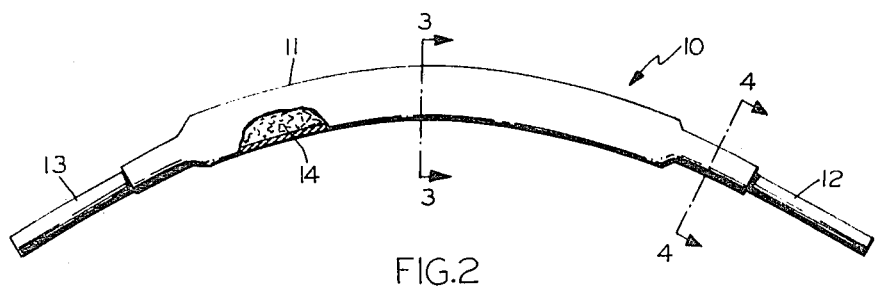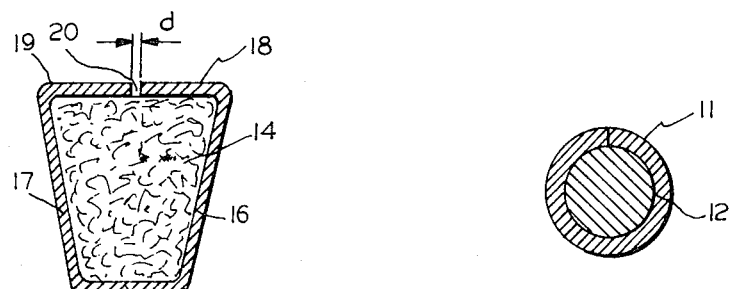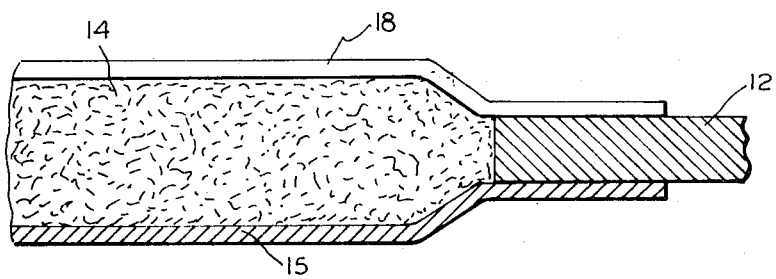
INVENTORS
PAOLO dELLA PORTA
ELIO RABUSIN

3,579,459
METAL VAPOR GENERATING COMPOSITIONS
Paolo Della Porta and Elio Rabusin, Milan, Italy, assignors to S.A.E.S. Getters S.p.A., Milan, Italy
Filed Dec. 13, 1967, Ser. No. 690,125
Claims priority, application Italy, Dec. 13, 1966, 31,040/66; Oct. 12, 1967, 21,538/67
Int. Cl. C09k 3/00; H01v 39/22
U.S. Cl. 252—181.4                   24 Claims

ABSTRACT OF THE DISCLOSURE (A) an open sitered matrix of a sinterizable material in a vacuum releases a metal vapor. The structure comprises (A) an open sintered matrix of sinterizable material and,
(B) a mixture, fixedly held within the sintered matrix, said mixture comprising:
  (1) a compound of a metal selected from the group consisting of mercury and the alkali metals said compound being reducible to its metal, and,
  (2) a stoichiometric excess of a reducing agent for said compound.

Devices employing these composite structures and processes for producing these structures.

---

It is frequently desirable to provide electron tubes containing metals such as mercury or the alkali metals. For example mercury is employed in numicator or nixies tubes whereas the alkali metals are employed in photosensitive surfaces such as those in television pick up tubes, photo multiplier tubes, electronic sights, image conversion tubes and intensifier tubes for radiological uses.

The above described metals have conventionally been introduced into electron tubes by means of metal vapor generators. These metal vapor generators generally comprise a container containing a compound of the metal and a reducing agent for that compound. The generator is introduced into the electron tube, the tube evacuated by conventional means, and the generator heated until the reducing agent reduces the compound generating the desired metal as a vapor. Such prior art generators are described for example in U.S. Pats. 1,733,809 and 1,747,648 as well as Eichenbaum et al. "Cesium Vapor Dispenser," The Review of Scientific Instruments, vol. 35, No. 6, June 1964 pp. 691–693.

Unfortunately the above and other prior art generators suffer from a number of disadvantages. For example they frequently release small particles which are electrically conductive and can cause short circuits and other difficulties within the electron tubes. Another disadvantage is their tendency to produce noxious gases such as oxygen or water vapor which are detrimental to the life and operation of the tube. Another disadvantage of these devices has been their poor yield of metal which is frequently less than 50% of theoretical. The above and other disadvantages lead to poor reproducibility of results from one generator to another causing numerable difficulties during mass production.

Accordingly it is an object of the present invention to provide novel composite structures which are substantially free of one or more of the disadvantages of the prior art. Another object is to provide metal vapor releasing composite structures which are particle free before, during and after metal vapor release. A further object is to provide gas free metal vapor releasing composite structures. Another object is to provide metal vapor releasing composite structures of highly reproducible and increased yields of greater than 75 to 80%. A still further object is to provide metal vapor generators in the form of devices employing particle free composite structures. Yet another object is to provide a novel process for producing the composite structures of the present invention. Additional objects and advantages will be apparent by reference to the following detailed description and figures wherein:

FIG. 1 is a plan view of a generator of the present invention;
FIG. 2 is an elevation of the generator of FIG. 1;
FIG. 3 is an enlarged sectional view taken along line 3—3 of FIG. 2;
FIG. 4 is an enlarged sectional view taken along line 4—4 of FIG. 2; and
FIG. 5 is an enlarged partial sectional view taken along line 5—5 of FIG. 1.

According to the present invention there is provided a particle-free composite structure which when heated in a vacuum releases a metal vapor, said structure comprising:

(A) an open sintered matrix of a sinterizable material, and,
(B) a mixture fixedly held within the sintered matrix, said mixture comprising:
  (1) a compound of a metal selected from the group consisting of mercury and the alkali metals said compound being reducible to its metal, and,
  (2) a stoichiometric excess of a reducing agent for said compound.

These composite structures are generally produced by placing the sinterizable material, compound, and reducing agent in a suitable container and preferably one similar to that shown in the drawings and then sintering the sinterizable material.

Suitable metallic compounds are well-known in the art and in general are those which are themselves stable to the temperatures necessary for sintering the sinterizable material but which will react with reducing agents to release their metals. Examples of suitable compounds include among others oxides of mercury such as mercuric oxide, alkali metal salts such as cesium chloride, cesium chromate, cesium dichromate, potassium chromate, sodium chromate, rubidium chromate and lithium chromate. The compound is employed in finely divided or granular form, and preferably that passing through a screen of 270 mesh per inch and retained on a screen of 600 mesh per inch, i.e. a particle size of less than $50\mu$ and preferably between 25 and $60\mu$.

In the broadest aspect of the present invention any reducing agent which will reduce the above compounds to their metals can be employed, examples of which include among others calcium, magnesium and silicon. In a preferred embodiment of the present invention a getter metal is employed as the reducing agent. This getter metal has the effect of not only reducing the compound to its metal but also of sorbing residual gases which may be evolved during the reduction of the compound. Examples of suitable getter metals include among others zirconium and zirconium-aluminum alloys. The most preferred getter metal is a zirconium-aluminum alloy and especially that alloy known as ST101 containing 84% zirconium and 16% aluminum produced in accordance with U.S. Pat. 3,203,901.

The reducing agent is employed in a stoichiometric excess in order to ensure complete reduction of the compound and is preferably present in an amount at least equal to 150% of the stoichiometric amount and generally from 1 to 10 parts by weight per part by weight of compound. However when the reducing agent is a zirconium aluminum alloy 4 to 9 parts by weight of reducing agent are preferred and when the reducing agent is silicon 1 to 2 parts by weight per part by weight of compound is preferred. The reducing agent is employed in a finely divided granular form. When the reducing agent is a zirconium aluminum alloy it generally passes through a screen of 170 mesh per inch and preferably passes through a screen of 170 mesh per inch but is retained on a screen of 325 mesh per inch, i.e. a particle size of less than 90$\mu$ and preferably between 40 and 90$\mu$. When the reducing agent is silicon it generally passes through a screen of 270 mesh per inch and preferably passes through a screen of 270 mesh per inch but is retained on a screen of 600 mesh per inch, i.e. a particle size of less than 60$\mu$ and preferably between 25 and 60$\mu$. Within the broad and preferred ranges set out above others skilled in the art can readily determine the optimum particle sizes and weight ratios for other reducing agents.

The sinterizable materials which can be employed in the present invention are those which will sinter under the conditions employed in order to form an open sintered matrix which fixedly holds the mixture of compounds and reducing agent. Suitable sinterizable materials are those which can be sintered at a temperature below the temperature of the onset of the reaction between the compound and the reducing agent. Additionally the sinterizable material preferably has a vapor pressure substantially less than that of the metal released in order that the metal releasing reaction does not also evaporate the sinterizable material. Examples of suitable sinterizable material include among others iron, nickel, cobalt, titanium, alloys thereof and mixtures thereof. Iron is the preferred sinterizable material. These materials are preferably employed in their pure form such as "Electronic grade A" or such as that produced by the thermal decomposition of the corresponding carbonyl. The sinterizable material is generally employed in finely divided granules such as those which pass through a screen of 600 mesh per inch and preferably those which pass through a screen of 600 mesh per inch and are retained on a screen of 450 (microlight No. 7) mesh per inch, i.e. those having particle size less than 25$\mu$ and preferably between 5 an 25$\mu$. The sinterizable material is employed in an amount sufficient to agglomerate the particles and preferably form the entire mass into an open sintered matrix generally comprises from 0.25 to 15 parts by weight per part by weight of the compound. Ideally the sinterizable material is 30 to 40 weight percent of the final mixture of sinterizable material, compound and reducing agent. In that preferred embodiment wherein the reducing agent is silicon a weight ratio of sinterizable material to compound of 0.5:1 to 5:1 is preferred whereas in that preferred embodiment wherein the reducing agent is zirconium aluminum alloy a weight ratio of sinterizable material to compound of 2:1 to 5:1 is preferred. Optimum weight ratios for other sinterizable materials can readily be determined by those skilled in the art.

The presence of a sinterizable material also contributes to the thermally conductive nature of the composite structure and thus helps to ensure even heating which increases the yield of metal vapor. Additionally certain sinterizable materials such as iron appear to function as auxiliary reducing agents enhancing the reduction of the compound.

In a preferred embodiment of the present invention the mixture additionally contains a thermic moderator present in an amount sufficient to reduce the rate of reaction below the rate at which it is self sustaining. The thermic moderator can be present in an amount up to 5 parts by weight per part of the compound but is preferably present in a weight ratio of 3 to 5 parts by weight per part of compound. Any thermic moderator heretofore employed to form a heat sink for exothermic reactions can be employed; the preferred thermic moderator being tungsten.

Although the composite structures of the present invention can be employed in a wide variety of specific generators or devices they are preferably employed in a container having a slit or opening in one of its walls.

Referring to the drawings, and in particular to FIGS. 1 and 2 thereof, there is shown a device 10 for generating metal vapors. The device 10 comprises a tube 11 having terminals 12 and 13 in each end thereof as shown in FIGS. 4 and 5. The terminals 12 and 13 seal the ends of the tube 11 and together with the walls thereof define a chamber containing the metal releasing composite structures 14 of the present invention. As shown in FIG. 3 in a preferred embodiment the tube 11 has a lower wall or base 15 connected to side walls 16 and 17. Side wall 16 is connected to top section 18 and side wall 17 is connected to top section 19. Top sections 18 and 19 together define the top wall which is parallel to the base 15. The sections 18 and 19 meet in juxtaposed relationship defining a slit 20 of diameter d which is preferably 20 to 50$\mu$.

In a preferred embodiment the tube 11 is constructed of a single piece of sheet metal of high electrical resistance such as stainless steel or the nickel chrome alloy known as Nichrome. In this embodiment the metal can be conveniently released from the composite structure 14 through the slit 20 by causing an electrical current to flow across terminals 12 and 13, and the tube 11 until the temperature is reached at which the compound begins to react with the reducing agent i.e. 700 to 800° C. in the case of cesium chromate mixed with silicon.

Many modifications will immediately become apparent and thus device 10 can be straight rather than arcuate as shown in FIG. 2, or the slit 20 can be located in side 15, 16 or 17.

According to another aspect of the present invention there is provided a novel process for producing the composite structures which when heated in a vacuum release the described metal vapors. The process comprises two steps the first step being the placing into a container such as that described above the mixture of the compound, reducing agent, and sinterizable material. The container and its contents are then sintered preferably by heating the container and its contents to a temperature below the temperature of the onset of the reaction between the compound and the reducing agent, for a time sufficient to sinter the sinterizable material. The heating can be conducted in a reducing atmosphere such as one consisting essentially of hydrogen at a pressure of less than $10^{-1}$ torr and preferably between $10^{-3}$ and $10^{-5}$ torr or under a high vacuum of less than $10^{-3}$ torr and preferably $10^{-5}$ to $10^{-8}$ torr. Thus in that preferred embodiment of the present invention wherein the compound is an alkali metal chromate, the reducing agent is silicon and the sinterizable material is nickel or iron, heating is effected at 500 to 600° C. for at least 1 hour and preferably 1 to 3 hours. For example the reaction of cesium chromate and silicon begins only at about 700 to 800° C.

The invention may be better understood by reference to the following examples in which all parts and percentages are by weight unless otherwise indicated. These examples are illustrative of certain embodiments designed to teach those skilled in the art how to practice the invention and to represent the best mode presently known for carrying out the invention, and are not intended to limit the scope of the invention in any manner. The screen sizes employed herein are U.S. Standard screen sizes.

EXAMPLE 1

This example illustrates the synthesis of mixtures which can be heated to produce particle free cesium releasing compositions.

A quantity of granular $Cs_2CrO_4$ is screened through a U.S. Standard screen of 270 mesh/inch. A quantity of granular silicon and a quantity of granular nickel are screened respectively through U.S. Standard screens of 270 and 600 mesh/inch. The screened $Cs_2CrO_4$ (1 gm.), silicon (1 gm.) and nickel (1 gm.) are intimately mixed to produce Mix A.

EXAMPLE 2

This example illustrates the synthesis of mixtures which can be heated to produce particle free compositions which release other alkali metals.

The procedure of Example 1 is repeated except that the $Cs_2CrO_4$ is replaced respectively by $K_2CrO_4$ (1 gm.) to produce Mix B; $Na_2CrO_4$ (0.4 gm.) to produce Mix C, $Li_2CrO_4$ (0.4 gm.) to produce Mix D, and $Rb_2CrO_4$ to produce Mix E.

The procedure of Example 1 is repeated except that the nickel is replaced by an equal weight of iron to produce Mix F.

EXAMPLE 3

This example illustrates the synthesis of a mixture which can be heated to produce a particle free mercury releasing composition.

A quantity of granular HgO is screened through a U.S. Standard screen of 450 microlight No. 5 mesh/inch. A quantity of granular ST101 alloy is screened through a U.S. Standard screen of 170 mesh/inch, and a quantity of pure iron produced by the decomposition of iron carbonyl is screened through a U.S. Standard screen of 600 mesh/inch. The screened HgO (1 gm.), ST101 alloy (6 gm.) and iron (3 gm.) are intimately mixed to produce Mix G.

EXAMPLE 4

This example illustrates the synthesis of a mixture which can be heated to produce particle free sodium releasing composites.

A quantity of granular $Na_2CrO_4$ is screened through a U.S. Standard screen of 270 mesh/inch. A quantity of granular ST101 alloy is screened through a U.S. Standard screen of 170 mesh/inch and a quantity of iron is screened through a U.S. Standard screen of 600 mesh/inch. The screened $Na_2CrO_4$ (1 gm.), ST101 alloy (4 gm.) and iron (2 gm.) are intimately mixed to produce Mix H.

EXAMPLE 5

This example illustrates the synthesis of mixtures containing a thermic moderator.

Granular tungsten is screened through a U.S. Standard screen of 600 mesh/inch. This screened tungsten (5 gm.) is mixed with Mix A (3 gm.) to produce Mix J.

EXAMPLE 6

This example illustrates the construction of a cesium generator.

A strip of nickel measuring 4.4 x 0.1 mm. and having a length L, and two cylindrical terminals having a diameter of 0.75 mm. and a length of x mm. are heated for 20 minutes in an oven in hydrogen at 1100° C. The strip and terminals are then removed from the oven, the strip is formed into a U-shaped channel the terminals attached to each end and filled with Mix A (25 mg./cm.) which is pressed into the channel. The U-shaped channel is then closed to form a generator similar to that shown in the drawings.

The generator is placed in a vacuum oven and heated for 2 hours while maintaining the temperature of the generator between 500 and 600° C. and while maintaining the pressure less than $10^{-6}$ torr by continuous operation of the vacuum pump of the oven. At the end of this time the dispenser is cooled to room temperature and packed in an air tight can filled with dry argon at atmospheric pressure. When shaken violently by hand the dispenser releases no loose particles.

To test the particle free nature of the dispenser during and after cesium vapor release, and to test the gas free nature of the dispensers, one of the above described dispensers is placed in a vessel having a volume of 2 liters and the pressure reduced to $10^{-7}$ torr whereupon a current of 7 amps is caused to flow through the dispenser for 15 minutes. During this time the pressure in the vessel, which was connected to a pumping system by means of a conductance of 1 l./sec., remained below $5 \times 10^{-6}$ torr indicating the gas free nature of the dispenser. The vessel is opened and the dispenser removed and shaken violently by hand without evidence of loose particles. The dispenser has yielded 75% of its cesium.

EXAMPLE 7

The procedure of Example 5 is repeated except that Mix A is replaced respectively by equal weights of Mix B through J with similar results.

EXAMPLE 8

The procedure of Example 5 is repeated except that the nickel strip and terminals are heated in a vacuum instead of in hydrogen and Mix A is replaced by 40 mg./cm. of Mix H. Similar results are obtained.

Although the invention has been described in considerable detail with reference to certain preferred embodiments thereof, it will be understood that variations and modifications can be effected within the spirit and scope of the invention as described above and as defined in the appended claims.

What is claimed is:

1. A composite structure which when heated in a vacuum releases a vapor of a metal selected from the group consisting of mercury and alkali metals, said structure consisting essentially of
    (A) an open sintered matrix of a sinterizable material which sinters at a temperature below the reaction temperature of the compound and the reducing agent, and,
    (B) a mixture fixedly held within the sintered matrix, said mixture comprising:
        (1) a compound of a metal selected from the group consisting of mercury and alkali metals said compound being reducible to its metal, and,
        (2) a reducing agent for said compound said reducing agent being present in excess of stoichiometry, wherein the sinterizable material comprises from 0.25 to 15 parts by weight per part by weight of the compound; wherein the sinterizable material has a vapor pressure less than that of the metal released from the compound.

2. The structure of claim 1 wherein the compound in HgO.

3. The structure of claim 1 wherein the compound is selected from the group consisting of $Cs_2CrO_4$, $K_2CrO_4$, $Na_2CrO_4$, $Li_2CrO_4$ and $Rb_2CrO_4$.

4. The structure of claim 1 wherein the reducing agent is an alloy of zirconium and aluminum.

5. The structure of claim 7 wherein the alloy contains 84% zirconium and 16% aluminum.

6. The structure of claim 1 wherein the sinterizable material has a particle size of 5 to 25$\mu$, the compound of the metal has a particle size of 25 to 60$\mu$ and the reducing agent is a zirconium-aluminum alloy having a particle size of 40 to 90$\mu$ all measured prior to sintering.

7. The structure of claim 1 wherein the reducing agent is silicon which comprises 1 to 2 parts by weight per part of compound and wherein said sinterizable material comprises from 0.5 to 2 parts by weight per part of compound.

8. The structure of claim 1 wherein the reducing agent is silicon.

9. The structure of claim 1 wherein the sinterizable material has a particle size of 5 to 25$\mu$, the compound of the metal has a particle size of 25 to 60$\mu$ and the reducing agent is silicon having a particle size of 25 to 60$\mu$.

10. The structure of claim 1 wherein the reducing agent is a zirconium-aluminum alloy which comprises 4 to 9 parts by weight per part of compound and wherein said sinterizable material comprises from 2 to 5 parts by weight per part of compound.

11. A composite structure of claim 1 which when heated in a vacuum releases an alkali metal vapor, said structure consisting essentially of:

(A) an open sintered matrix of a granular sinterizable material which sinters at a temperature below the reaction temperature of the compound and the reducing agent, and, (B) a mixture fixedly held within the sintered matrix said mixture comprising:

(1) an alkali metal chromate, and, (2) silicon present in excess of stoichiometry, wherein the sinterizable material comprises from 0.25 to 15 parts by weight per part by weight of the compound; wherein the sinterizable material has a vapor pressure less than that of the metal released from the compound.

12. A composite structure of claim 1 which when heated in a vacuum releases mercury vapor, said structure consisting essentially of:

(A) an open sintered matrix of a granular sinterizable material which sinters at a temperature below the reaction temperature of the compound and the reducing agent, and (B) a mixture fixedly held within the sintered matrix said mixture comprising:

(1) an oxide of mercury, and (2) a granular zirconium-aluminum alloy as a reducing agent for said oxide of mercury said reducing agent being present in excess of stoichiometry, wherein the sinterizable material comprises from 0.25 to 15 parts by weight per part by weight of the compound; wherein the sinterizable material has a vapor pressure less than that of the metal released from the compound.

13. A composite structure of claim 1 which when heated in a vacuum releases an alkali metal vapor, said structure consisting essentially of:

(A) an open sintered matrix of a granular sinterizable material which sinters at a temperature below the reaction temperature of the compound and the reducing agent, and, (B) a mixture fixedly held within the sintered matrix said mixture comprising:

(1) an alkali metal chromate and (2) a zirconium-aluminum alloy present in excess of stoichiometry.

14. A process for producing a composite structure of claim 1 which when heated in a vacuum releases a vapor of a metal selected from the group consisting of mercury and alkali metals, said process comprising in sequence the steps of:

(I) placing into a container a mixture of (a) a compound of a metal selected from the group consisting of mercury and the alkali metals said compound being reducible to its metal, (b) a reducing agent for said compound said reducing agent being present in excess of stoichiometry, (c) a material, sinterizable at a temperature below the temperature of the onset of the reaction between said compound and said reducing agent;

(II) sintering the sinterizable material at a temperature below the temperature of the onset of the reaction between said compound and said reducing agent.

15. The process of claim 14 wherein said sintering is effected at a pressure of less than $10^{-3}$ torr.

16. The process of claim 14 wherein said sintering is effected at a pressure of $10^{-5}$ to $10^{-8}$ torr.

17. The process of claim 14 wherein said sintering is effected in a reducing atmosphere at a pressure of less than $10^{-1}$ torr.

18. The process of claim 17 wherein the pressure is between $10^{-3}$ and $10^{-5}$ torr.

19. The process of claim 17 wherein the reducing atmosphere consists essentially of hydrogen.

20. The process of claim 14 wherein the weight ratio of $a:b:c$ is 1:1 to 2:0.5 to 2, and wherein the reducing agent is silicon.

21. The process of claim 14 wherein the weight ratio of $a:b:c$ is 1:4 to 9:2 to 5.

22. A process for producing a composite structure of claim 1 which when heated in a vacuum releases a vapor of a metal selected from the group consisting of mercury and alkali metals, said process comprising in sequence the steps of:

(I) placing into a container a mixture of (a) a compound of a metal selected from the group consisting of mercury and the alkali metals said compound being reducible to its metal, (b) a reducing agent for said compound, said reducing agent being present in excess of stoichiometry.

(c) a material, sinterizable at a temperature below the temperature of the onset of the reaction between said compound and said reducing agent;

(II) heating the container and its contents to a temperature below the temperature of the onset of the reaction between said compound and said reducing agent; at a pressure of less than $10^{-3}$ torr; for a time sufficient to sinter the sinterizable material and remove residual gases from the mixture and the container.

23. A process for producing the composite structure of claim 1 which when heated in a vacuum releases a vapor consisting essentially of an alkali metal, said composite structure being free of loose particles before, during and after release of said vapor, said process comprising in sequence the steps of:

(I) placing into a container a mixture of

| | Parts by weight |
|---|---|
| Alkali metal chromate | 1 |
| Silicon | 1–2 |
| Nickel or iron | 0.5–2 |

(II) heating the container and its contents at 450 to 550° C. for at least one hour at a pressure of less than $10^{-5}$ torr in order to effect sintering of the nickel or iron and removal of residual gases from the container and the mixture.

24. A process for producing the composite structure of claim 1 which when heated in a vacuum releases a vapor consisting essentially of an alkali metal, said composite structure being free of loose particles before, during and after release of said vapor, said process comprising in sequence the steps of:

(I) placing into a container a mixture of

| | Parts by weight |
|---|---|
| Alkali metal chromate | 1 |
| Zirconium-aluminum alloy | 4–9 |
| Nickel or iron | 2–5 |

(II) heating the container and its contents at 450 to 550° C. for at least one hour at a pressure of less than $10^{-5}$ torr in order to effect sintering of the nickel or iron and removal of residual gases from the container and the mixture.

References Cited

UNITED STATES PATENTS

| 2,930,921 | 3/1960 | Cappelletti et al. | 316—16X |
| 3,096,211 | 7/1963 | Davis | 252—181.4X |
| 3,385,644 | 5/1968 | Della Porta et al. | 316—16 |

TOBIAS E. LEVOW, Primary Examiner

J. COOPER, Assistant Examiner

U.S. Cl. X.R.

252—181.3

UNITED STATES PATENT OFFICE
CERTIFICATE OF CORRECTION

Patent No. 3,579,459          Dated May 18, 1971

Inventor(s) Paolo della Porta, Elio Rabusin

It is certified that error appears in the above-identified patent and that said Letters Patent are hereby corrected as shown below:

In the Abstract, add the following in the beginning:

" A particle-free composite structure which when heated in a vacuum releases a metal vapor. The structure comprises: "

Column 6, line 43 for "in" insert --is--.

Column 7, line 66 for "10-1" insert --$10^{-1}$--.

Signed and sealed this 9th day of November 1971.

(SEAL)
Attest:

EDWARD M. FLETCHER, JR.          ROBERT GOTTSCHALK
Attesting Officer          Acting Commissioner of Patents